United States Patent [19]

Adolfsson et al.

[11] 4,434,665

[45] Mar. 6, 1984

[54] INTEGRATED CAPACITIVE TRANSDUCER

[75] Inventors: Morgan Adolfsson; Sture Göransson; Bertil Hök, all of Västeras, Sweden

[73] Assignee: ASEA Aktiebolag, Västeras, Sweden

[21] Appl. No.: 343,105

[22] Filed: Jan. 27, 1982

[30] Foreign Application Priority Data

Jan. 29, 1981 [SE] Sweden .................................. 8100638

[51] Int. Cl.³ .............................................. G01L 9/12
[52] U.S. Cl. ...................................... 73/724; 73/766; 73/862.68
[58] Field of Search ..................... 73/766, 724, 862.68; 324/61 R, 60 C

[56] References Cited

U.S. PATENT DOCUMENTS 3,753,373  8/1973  Brown .............................. 324/61 R
4,227,419 10/1980  Park ................................... 73/724
4,301,492 11/1981  Paquin et al. ..................... 73/724
4,322,977  4/1982  Sell et al. ......................... 73/724

Primary Examiner—Anthony V. Ciarlante
Attorney, Agent, or Firm—Watson, Cole, Grindle & Watson

[57] ABSTRACT

A capacitive transducer indicates the value of a physical quantity to be measured and is constructed with two spaced electrically conducting plates movable relative to one another in response to a mechanical signal representative of the physical quantity to be measured to generate an electrical signal in response thereto with the transducer capacitor being actuated and de-actuated to be respectively responsive and non-responsive to the mechanical signal in accordance with pre-designated time intervals. The electrical signal in accordance with the capacitance of the transducer capacitor is integrated to provide an output signal when the integrated signal exceeds a reference value.

19 Claims, 8 Drawing Figures

4,434,665

INTEGRATED CAPACITIVE TRANSDUCER

TECHNICAL FIELD

The present invention relates to a capacitive transducer for indication/registration of quantities to be measured such as pressure, temperature, acceleration, elongation or force. Changes in the quantity in question are arranged to create small relative movements between two electrically conducting layers in at least one transducer capacitor, of which at least one layer is rigidly connected to a substrate which may comprise integrated passive and active semiconductor components.

Problems in connection with such transducers are how to obtain small physical dimensions, how to calibrate them in a simple manner and how to obtain long-term stability without dependence on active component parameters. It is also desirable that the transducer have a low power consumption and a small sensitivity to interference.

STATEMENT OF INVENTION

The invention aims to provide a solution to the abovementioned problems and other problems associated therewith.

According to the invention there is provided a capacitive transducer for indication/registration of a quantity to be measured, changes in which quantity give rise to a mechanical signal which causes relative movement between two electrically conducting layers in at least one transducer capacitor of the transducer, at least one plate of which transducer capacitor is rigidly connected to a substrate, which is characterised in that the substrate supports at least two further capacitors in addition to said at least one transducer capacitor, and that with each of these capacitors there is associated at least one controllable switch means.

ADVANTAGES OF INVENTION

A capacitive transducer in accordance with the invention has a number of advantages in relation to known capacitive transducers of this kind, namely:
 small physical dimensions of the transducer
 the transducer can be manufactured in rational production by employing monolithic technology
 the transducer can be easily calibrated by independently setting the capacitances of the capacitors included therein
 the long-term stability is not dependent on active component parameters, only on capacitance values
 the same substrate can be used for several different types of transducers, only the sensing capacitive transducer need be modified
 low lower consumption, which permits input power feed and control via optical signals
 small sensitivity to electromagnetic interference because of the possibility of optical feed and the small physical dimensions
 the transducer can be used in severe environments, for example in explosive atmospheres.

BRIEF DESCRIPTION OF DRAWINGS

The invention will now be described, by way of example, in greater detail with reference to the accompanying drawings, in which.

DESCRIPTION OF PREFERRED EMBODIMENTS

Figure 1:
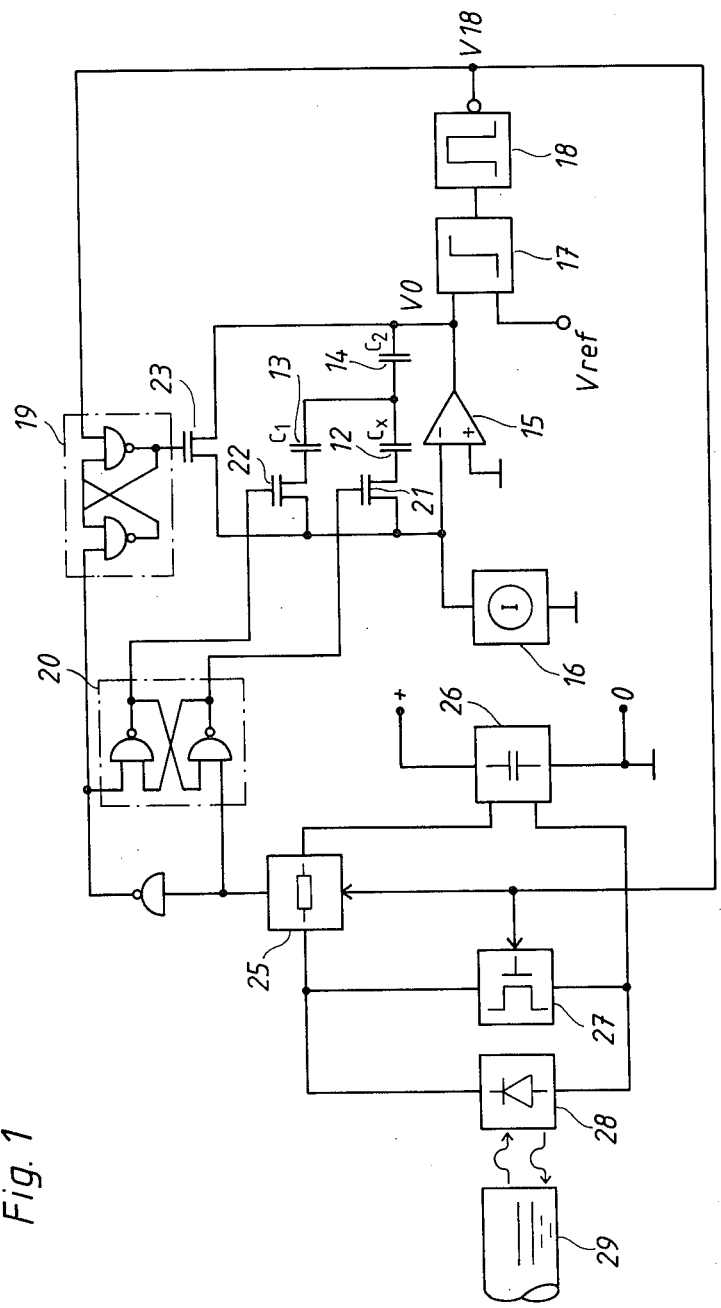
FIG. 1 shows a block diagram of a typical transducer according to the invention.

The mode of operation of a capacitive transducer according to one embodiment of the invention will first be described with reference to FIGS. 1 and 6. The power supply to and control of the capacitive transducer take place optically from an optical fiber, the end of which is shown at 29 in FIG. 1. A photo-luminescent diode 28, for example a diode of the kind described in U.S. patent application Ser. No. 275,789 filed on June 22, 1981 now U.S. Pat. No. 4,417,140 in the names of Adolfsson, Brogårdh and Ovren (and assigned to the assignees of this application), provides an output voltage which is stored and possibly raised in a capacitor/voltage doubler 26. The voltage supply for the remainder of the electronic circuit is obtained across the capacitor 26. the photo-luminescent diode 28 receives optical control pulses, which are obtained via the fiber 29 and which are detected across a depletion transistor 25. This depletion transistor 25 may also be a resistor, and the purpose of this is to prevent the voltage from the voltage doubler 26 from being short-circuited. Transmission of optical information back to the fiber 29 takes place by short-circuiting the photo-luminescent diode 28 by means of an MOS switch 27 (a field effect transistor).

A transducer capacitor $C_x$ (12), a neutral point capacitor $C_1$ (13) and a calibrating capacitor $C_2$ (14) are connected into an integrator circuit, consisting of a current generator 16, an operational amplifier 15 and three MOS switches 21, 22 and 23. In the absence of control pulses, the switch 23 is closed, and therefore the output signal from the integrator circuit is zero. When a control pulse (such as 30 in FIG. 6) arrives, a flip-flop 19 is changed over and the switch 23 opens. Let it now be assumed that a flip-flop 20 has such a condition that the switch 22 is closed and the switch 21 is open. the integrator circuit will then charge the series capacitance of $C_1$ (13) and $C_2$ (14) until the voltage reaches the value $V_{ref}$. After this charging time (shown as $T_1$ in FIG. 6), a comparator 17 (see FIG. 1), connected to the operational amplifier 15, charges over and a pulse 32 (see FIG. 6) is delivered from a mono-flipflop 18, which is connected to the comparator 17, which via the flip-flop 19 closes the switch 23, and the output signal of the integrator circuit is again zero. The pulse 32 from the mono-flipflop 18 simultaneously short-circuits the photo-luminescent diode 28 via the switch 27, so that the time information $T_1$ is transmitted by means of a modulation of the intensity of the luminescence.

Figure 6:
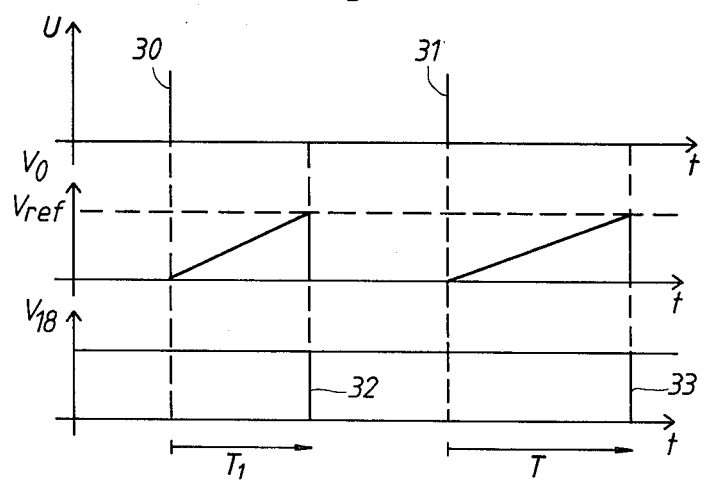
FIG. 6 illustrates the mode of operation of a transducer in the form of three graphs with respect to time.

The uppermost graph in FIG. 6 plots the magnitude U of the control pulses on the y-axis against time on the x-axis. Below this graph is a second showing the output signal from the integrator $V_0$ along the y-axis and time along the x-axis, and the lowermost graph shows the output signal from the photo-luminescent diode $V_{18}$ on the y-axis and time along the x-axis. It can be seen that when the pulse 30 arrives, and when the next control pulse 31 arrives the process is repeated with the difference that the flip-flop 20 then assumes such a position that the switch 21 is closed and the switch 22 is open. The integration capacitance will then be the series capacitance of $C_x$ (12) and $C_2$ (14). In a corresponding way, after the time T a pulse 33 is obtained from the mono-flipflop 18. The pulse 33 activates the photoluminescent diode 28 and delivers a reset signal to the flip-flop 19. As will be clear from the relationships in the following equations, the ratio $T_1/T$ carries the signal information of the transducer, and this quotient thus provides a measure of the pressure, acceleration, force, or whatever other quantity is being measured.

$$\frac{\frac{I \cdot T_1}{C_2}}{1 + \frac{C_2}{C_1}} = \frac{\frac{I \cdot T}{C_2}}{1 + \frac{C_2}{C_x}} = V_{ref}$$

$$C_x = \frac{A \cdot \epsilon \epsilon_0}{d} \quad C_x(x=0) = C_1$$

$$d = d_0 + B \cdot x$$

$$1 + \frac{C_2}{C_x} = \frac{T_1}{T}\left(1 + \frac{C_2}{C_1}\right)$$

$$\frac{1}{C_x} = \frac{1}{C_1} + \frac{B \cdot x}{C_1 \cdot d_0}$$

$$\frac{T_1}{T} = 1 + \frac{B \cdot C_2}{C_1 + C_2} \cdot \frac{x}{d_0}$$

The designations employed in the above equations are as follows:
A = capacitor area
$\epsilon$ = relative permittivity
$\epsilon_0$ = dielectric constant
d = plate distance
x = mechanical input signal
B = mechanical calibrating factor
$d_0$ = plate distance when the mechanical input signal is zero.

The other designations will be clear from FIGS. 1 and 6.

Thus, it follows that the ratio $T_1/T$ will be dependent on the mechanical input signal x, that is, the quantity being measured, and therfore constitutes a measure of the indicated quantity being measured.

By choosing $C_1 = C_x$ when the mechanical input signal is zero, $T_1/T = 1$ independently of the value of $C_2$. $C_1$ may be adjusted to this value, for example by varying its capacitor area A. When this adjusting operation is completed, the calibrating factor can be trimmed in a corresponding manner, so that a standardized output signal is obtained for a certain value of the mechanical input signal x. This is done by setting the capacitance $C_2$. The control pulses 30 and 31, the reset pulses 32 and 33 and the two time intervals $T_1$ and T, respectively, are shown in FIG. 6.

Figure 2:
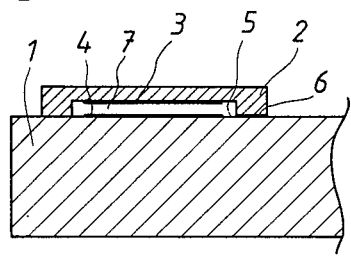
FIGS. 2, 3, 4 and 5 show in cross-section and on a large scale some embodiments of transducer capacitors used in a transducer according to FIG. 1.

FIG. 2 shows a transducer for absolute pressure measurement. A substrate plate 1 comprises the integrated circuit and a metallized or highly doped layer 4, constitutes one of the capacitor plates of the transducer capacitor. The other capacitor plate consists of a semiconductor material with high doping at the surface or of a metallic layer 3 in electrically conducting contact with a point on the substrate plate 1. A support plate 2 preferably having the same temperature coefficient of expansion as the substrate plate 1) is formed so that a closed volume 7 is formed between the substrate plate 1 and the plate 2. The substrate plate 1 is electrically insulated in certain parts (5), in order to provide insulation between the layers 4 and 6 of the capacitor. The volume 7 is suitably evacuated to avoid the effect of temperature changes on a contained gas volume. A hydrostatic pressure change will influence the plate 2 so that this is bent (hydrostatic pressure here being the quantity to be measured, which results in a capacity change, since the average distance between the layers 3 and 4 is then varied. The deflection is dependent on, among other things, the thickness of the plate 2 and the modulus of elasticity of the material from which it is made. All components according to FIG. 1 are part of the integrated circuit, except the photo-luminescent diode 28 and the fiber 29.

Figure 3:
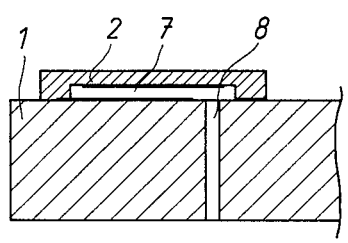

FIG. 3 shows a pressure transducer for measuring relative pressure. The construction is analogous to that shown in FIG. 2. A hole 8 is provided in the substrate plate 1 and extends to the space 7 below the plate 2. This hole 8 is intended to provide pressure equalization between the contained volume 7 and the back side of the substrate plate 1.

Figure 4:
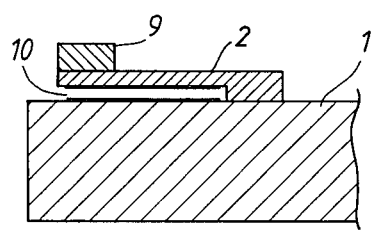

FIG. 4 shows an accelerometer, constructed along the same principles as described above. A mass 9 is mounted on the plate 2 which in this case need not make contact at both ends with the substrate 1, but may have a gap 10 between it and the substrate plate 1 at one end.

Figure 5:
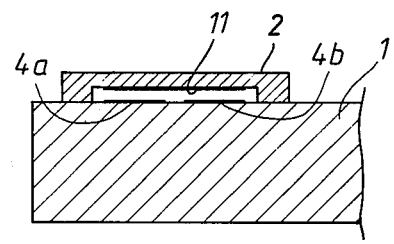

FIG. 5 shows an absolute pressure transducer, where there need be no galvanic contact between the substrate plate 1 and the plate 2. In this case the transducer capacitance consists of the series capacitance between two partial capacitors (11, 4a and 11, 4b) between the substrate plate 1 and the plate 2.

Figure 7:
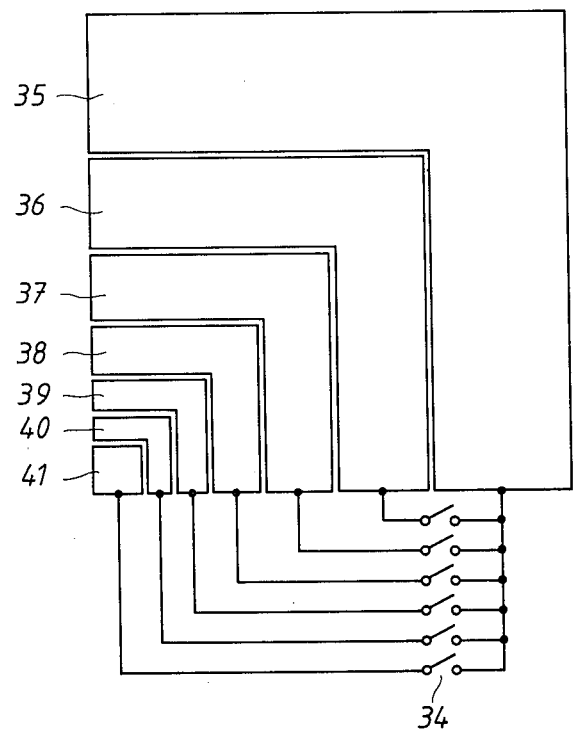
FIG. 7 shows an embodiment of trimmable capacitor for setting the neutral point and the calibrating factor of a transducer.

FIG. 7 shows one embodiment of the capacitor $C_1$ (13) or $C_2$ (14), which makes possible a gradual setting to a suitable capacitance value. The capacitor area available is subdivided in such a way that the area 36 is one-half of the area 35, the area 37 is one-half of the area 36, and so on. The different capacitor areas may be interconnected by a number of switches 34. These, as well as the capacitor areas 35-41, are located on the substrate. In the simplest case the switches 34 may each consist of a thin metallic wire which can be broken by being burnt away. Alternatively, the switches 34 may be MOS transistors with a memory function, for example MNOS cells or FAMOS cells, in which case the making or breaking function maybe programmed as an electric voltage. The number of sub-divisions of the total capacitor area will, in practice, be determined by the desired accuracy of setting and the technically possible repeatability in the manufacture of the chosen pattern.

Figure 8:
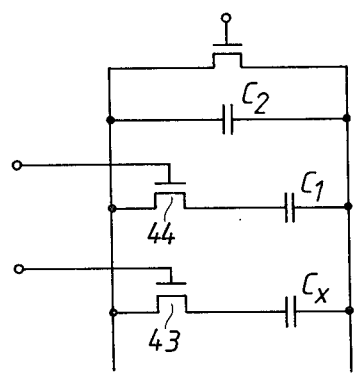
FIG. 8 schematically illustrates an alternative part of the circuit of FIG. 1.

FIGS. 2 top 5 show arrangements in which the mechanical input signal is allowed to influence the plate distance d in the capacitor. Assuming $C = A \cdot \epsilon \epsilon_0/d$ for an ordinary plate capacitor, the area A or the dielectric constant $\epsilon_0$ can also be mechanically modulated. In these cases it is advantageous from the point of view of linearity, to modify the integrator circuit in FIG. to that shown in FIG. 8. In the arrangement of FIG. 8 the MOS switches are shown at 43 and 44, the three capacitors being mutually parallel-connected with the MOS switch 43 in series with the transducer capacitor Cx and the MOS switch 44 in series with the capacitor $C_1$. The arrangement also includes devices for different connection sequences of th capacitors.

The embodiments of capacitive transducer described above may be varied in many ways within the scope of the following claims.

What is claimed is:

1. A transducer for indicating the value of a physical quantity to be measured, comprising:
   a transducer capacitor having two spaced electrically conducting plates movable relative to one another in response to a mechanical signal representative of the physical quantity to be measured and for generating an electrical signal in response thereto;
   capacitive means for trimming said transducer capacitor;
   means for actuating and de-actuating said transducer capacitor to be respectively responsive and non-responsive to said mechanical signal in accordance with pre-designated time intervals;
   means for integrating an electrical signal in accordance with the capacitance of said transducer capacitor and providing an output signal when the integrated signal exceeds a reference value; and
   means for receiving control signals for controlling said means for actuating and for transmitting said output signal 2. A transducer according to claim 1, in which one of the conducting plates of the transducer capacitor is mounted on a support plate, which at least at one point is rigidly connected to a substrate and which by being deflected by the mechanical signal is moved relative to the substrate.

3. A transducer according to claim 2, in which the support plate is made of a material having substantially the same temperature coefficient of expansion as the substrate.

4. A transducer according to claim 3, in which the support is made of the same material as the substrate.

5. A transducer according to claim 2 in which the substrate and the other of said conducting plates are at least partially separated by a closed volume.

6. A transducer according to claim 2 in which the substrate and the other of said conducting plates are partially separated by a volume which is closed, except for a hole provided in the substrate.

7. A transducer according to claim 2 in which the substrate and the other of said, conducting plates are partially separated by a volume which is closed, except for a channel between the support plate and the substrate.

8. A transducer according to claim 7, in which the support plate is in mechanical connection with a mass, the force exerted on said mass caused by acceleration causing a deflection of the support plate.

9. A transducer according to claim 1, wherein said means for receiving and transmitting includes means for receiving and transmitting optical energy.

10. A transducer according to claim 9 wherein said means for receiving and transmitting optical energy is a photo-luminescent diode.

11. A transducer as claimed in claim 1, wherein said capacitive means includes a first capacitor having essentially the same capacitance value as said transducer capacitor in the absence of a mechanical signal applied thereto for nulling said output signal.

12. A transducer as claimed in claim 1, wherein said capacitive means further includes a second capacitor for calibrating the electrical signal from said transducer capacitor.

13. A transducer as claimed in claim 12, in which at least one of said first or second capacitors is constructed with one of its plates sub-divided into plate parts, said plate parts being connected together by further electrical switch means.

14. A transducer as claimed in claim 13, in which the area of at least one of the plate parts is half that of one adjacent plate part and twice that of the other adjacent plate part.

15. A transducer according to claim 14, in which said further electrical switch means comprises at least one breakable metallic connection.

16. A transducer as claimed in claim 1 wherein said means for actuating and de-actuating includes a first transistor switch for actuating said first capacitor and said transducer capacitor, a second transistor switch for actuating said second capacitor and said transducer capacitor and a third switch for de-actuating said first and second capacitors and said transducer capacitor.

17. A transducer as claimed in claim 16 wherein said first and second capacitors are respectively connected in parallel and in series with said transducer capacitor by said first and second transistor switches.

18. A transducer as claimed in claim 1 wherein said means for actuating and de-actuating includes means for storing a control signal for actuating or de-actuating said transducer capacitor.

19. A transducer as claimed in claim 16, in which said first, second and third transistor switches are respective field effect transistors.

* * * * *